(12) United States Patent
Kaneko et al.

(10) Patent No.: US 9,035,548 B2
(45) Date of Patent: May 19, 2015

(54) ELECTRON EMISSION ELEMENT, ELECTRON EMISSION DEVICE, CHARGE DEVICE, IMAGE FORMING DEVICE, ELECTRON RADIATION CURING DEVICE, LIGHT-EMITTING DEVICE, IMAGE DISPLAY DEVICE, BLOWER DEVICE, COOLING DEVICE, AND MANUFACTURING METHOD FOR ELECTRON EMISSION ELEMENT

(75) Inventors: Toshihiro Kaneko, Osaka (JP); Tadashi Iwamatsu, Osaka (JP); Ayae Nagaoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 13/991,653

(22) PCT Filed: Nov. 30, 2011

(86) PCT No.: PCT/JP2011/077699
§ 371 (c)(1),
(2), (4) Date: Jun. 5, 2013

(87) PCT Pub. No.: WO2012/077558
PCT Pub. Date: Jun. 14, 2012

(65) Prior Publication Data
US 2013/0249386 A1    Sep. 26, 2013

(30) Foreign Application Priority Data

Dec. 7, 2010  (JP) ................................. 2010-272779

(51) Int. Cl.
*H01J 1/32*      (2006.01)
*H01J 1/312*     (2006.01)
(Continued)

(52) U.S. Cl.
CPC .. *H01J 1/312* (2013.01); *B41J 2/39* (2013.01); *G03G 15/0291* (2013.01); *H01J 9/02* (2013.01);
(Continued)

(58) Field of Classification Search
CPC ........... H01J 1/30; H01J 1/304; H01J 1/3048; H01J 1/308; H01J 1/312; H01J 1/316; H01J 2201/312; H01J 2201/3125; H01J 2329/0478–2329/0484; H01J 9/02–9/027; H01J 9/042–9/047; H01J 2209/01; H01J 2209/012; H01J 2209/02–2209/0223
USPC ............. 445/35; 313/509, 495–497, 309–311
See application file for complete search history.

(56) References Cited

U.S. PATENT DOCUMENTS

2007/0222355 A1*  9/2007  Tsou et al. ................... 313/311
2010/0215402 A1*  8/2010  Nagaoka et al. ............. 399/168
(Continued)

FOREIGN PATENT DOCUMENTS

JP      2009-146891 A      7/2009

OTHER PUBLICATIONS

Official Communication issued in International Patent Application No. PCT/JP2011/077699, mailed on Jan. 10, 2012.

*Primary Examiner* — Nimeshkumar Patel
*Assistant Examiner* — Jacob R Stern
(74) *Attorney, Agent, or Firm* — Keating & Bennett, LLP (57) ABSTRACT

An electron emission element (1) includes an electrode substrate (2) and a thin film electrode (3), and emits electrons from the thin film electrode (3) by voltage application across the electrode substrate (2) and the thin film electrode (3). An electron accelerating layer (4) containing at least insulating fine particles (5) is provided between the electrode substrate (2) and the thin film electrode (3). The electrode substrate (2) has a convexoconcave surface. The thin film electrode (3) has openings (6) above convex parts of the electrode substrate (2).

16 Claims, 7 Drawing Sheets

(51) Int. Cl.
 *B41J 2/39* (2006.01)
 *G03G 15/02* (2006.01)
 *H01J 9/02* (2006.01)
 *H01J 31/12* (2006.01)
 *B41J 2/41* (2006.01)
 *H01J 63/02* (2006.01)
 *H01J 63/06* (2006.01)
 *H05B 33/22* (2006.01)
 *G21K 5/02* (2006.01)
 *G02F 1/1335* (2006.01)

(52) U.S. Cl.
 CPC ............... *H01J 31/127* (2013.01); *H01J 9/025* (2013.01); *H05B 33/22* (2013.01); *B41J 2/41* (2013.01); *H01J 63/02* (2013.01); *H01J 63/06* (2013.01); *G21K 5/02* (2013.01); *G02F 2001/133614* (2013.01); *G02F 2001/133625* (2013.01)

(56) References Cited

U.S. PATENT DOCUMENTS

| | | |
|---|---|---|
| 2010/0278561 A1 | 11/2010 | Kanda et al. |
| 2010/0327730 A1* | 12/2010 | Hirakawa et al. ............. 313/235 |
| 2011/0129256 A1* | 6/2011 | Hirakawa et al. ............. 399/168 |
| 2011/0254431 A1* | 10/2011 | Hirakawa ..................... 313/326 |

* cited by examiner

ELECTRON EMISSION ELEMENT, ELECTRON EMISSION DEVICE, CHARGE DEVICE, IMAGE FORMING DEVICE, ELECTRON RADIATION CURING DEVICE, LIGHT-EMITTING DEVICE, IMAGE DISPLAY DEVICE, BLOWER DEVICE, COOLING DEVICE, AND MANUFACTURING METHOD FOR ELECTRON EMISSION ELEMENT

TECHNICAL FIELD

The present invention relates to an electron emission element for emitting electrons on receipt of a voltage which is applied to the electron emission element.

BACKGROUND ART

An electron emission element for emitting electrons by utilizing field electron emission has been conventionally known. The field electron emission is a method for emitting electrons, wherein electrons are emitted by applying a voltage across two electrodes, and the application of the voltage forms a high electric field between the electrodes, thereby causing electrons to be emitted from one (emitter) of the electrodes due to a tunnel effect. Different types of field electron emission elements are known, such as a spint-type field electron emission element and a carbon nanotube (CNT) field electron emission element, which are different in emitter structure.

There has been a demand for an electron emission element capable of being used in the air. It is, however, theoretically difficult to operate, in the air, the electron emission element which carries out the field electron emission. The reason for such difficulty in operation is as follows: a high electric field is required for the field electron emission, and therefore, emitted electrons have a high energy. Collision of such high-energy electrons with gas molecules in the air ionizes the gas molecules. Cations generated by the ionization are (i) accelerated toward a surface of the electron emission element by the high electric field which is formed in the vicinity of the electron emission element and (ii) collided with the surface. This ultimately causes sputtering. The sputtering destroys the electron emission element. It is further known that collision of the high-energy electrons with oxygen molecules does not ionize the oxygen molecules but generates ozone. Ozone is a remarkably active and toxic material, and deteriorates various materials.

On this account, the electron emission element which carries out the field electron emission is generally used in a sealed vacuum. In a case where it is necessary to take electrons out from the sealed vacuum to the air, the electrons should be emitted into the air via an electron transmission window which separates a vacuum layer from the air.

On the other hand, electron emission elements called an MIM type electron emission element and an MIS type electron emission element are known each as an electron emission element capable of stably operating in the air (see Patent Literature 1). The MIM type electron emission element is made up of three layers of a thin film metal electrode, an insulating layer, and a metal electrode substrate. The MIS type electron emission element is made up of three layers of a thin film metal electrode, an insulating layer, and a semi-conducting electrode substrate. The insulating layers are hereinafter referred to as electron accelerating layers because electrons are accelerated in the insulating layers of the respective MIM type and MIS type electron emission elements. By applying a voltage across electrodes which sandwich each of the electron accelerating layers, electrons are accelerated in each of the electron accelerating layers, and some of the electrons are (i) caused to transmit the thin film metal electrodes of the respective MIM type and MIS type electron emission elements and (ii) two-dimensionally emitted from whole surfaces of the respective MIM type and MIS type electron emission elements.

The MIM type and the MIS type electron emission elements are identical to the electron emission element which carries out the field electron emission, in that electrons are (i) accelerated by an electric field formed between electrodes and (ii) emitted outside of an electron emission element. However, the MIM type and the MIS type electron emission elements are greatly different from the electron emission element which carries out the field electron emission, in that in a case of the MIM type and the MIS type electron emission elements, formation of an electric field during operation of an electron emission element is limited to within the electron emission element. Such limitation allows the MIM type and the MIS type electron emission elements to stably operate in the air.

The MIM type and the MIS type electron emission elements are (i) thus capable of stably operating in the air and (ii) surface emission type electron emission elements.

CITATION LIST

Patent Literature

Patent Literature 1
Japanese Patent Application Publication, Tokukai, No. 2009-146891 A (Publication Date: Jul. 2, 2009)

SUMMARY OF INVENTION

Technical Problem

However, an electron emission element disclosed in Patent Literature 1 has a problem of increase in power consumption in driving of the electron emission element. The problem is caused by the fact that the electron emission element emits many electrons, whereby much current tends to flow in the electron emission element.

An object of the present invention is to provide an electron emission element, with a high electron emission efficiency, which emits many electrons with use of less current.

Solution to Problem

An electron emission element of an embodiment of the present invention is configured to be an electron emission element, including: an electrode substrate; a thin film electrode; and an electron accelerating layer between the electrode substrate and the thin film electrode, the electron accelerating layer containing at least insulating fine particles, the electron emission element emitting, from the thin film electrode, electrons which are accelerated between the electrode substrate and the thin film electrode by voltage application across the electrode substrate and the thin film electrode, the electrode substrate having a convexoconcave surface on which the electron accelerating layer is provided, and the thin film electrode having openings above convex parts of the convexoconcave surface of the electrode substrate.

According to the electron emission element, the voltage application across the electrode substrate and the thin film electrode causes (i) an electric field to be formed in the electron accelerating layer and (ii) electrons to flow as current carriers in the electron accelerating layer. Some of the electrons are accelerated by the electric field, emitted as ballistic electrons from the electron accelerating layer, and emitted outside of the electron emission element (i) via the openings formed in the thin film electrode or (ii) by tunneling the thin film electrode.

The ballistic electrons emitted from the electron accelerating layer are thus emitted outside of the electron emission element (i) via the openings of the thin film electrode or (ii) by tunneling the thin film electrode. Tunneling the thin film electrode remarkably decreases an amount of electrons to be emitted outside of the electron emission element, due to a tunnel probability which depends on a thickness of the thin film electrode. Meanwhile, ballistic electrons which pass through the openings of the thin film electrode are not blocked but emitted from the electron accelerating layer outside of the electron emission element. That is, in a case where electrons are emitted via the openings, the amount of electrons to be emitted is not decreased.

The electron accelerating layer, which is formed on the convexoconcave surface of the electrode substrate so as be flat for manufacture of the electron emission element, is thick in a concave part of the electrode substrate but thin above the convex parts of the electrode substrate. Voltage application across the electrode substrate having the convexoconcave surface and the thin film electrode forms an electric field in the electron accelerating layer above the convexoconcave surface of the electrode substrate. The electric field is stronger above the convex parts (where the electron accelerating layer is thinner) of the electrode substrate than in the concave part of the electrode substrate.

The electric field which is stronger above the convex parts of the electrode substrate dielectrically breaks down the electron accelerating layer above the convex parts of the electrode substrate, whereby the openings are formed in the thin film electrode so as to correspond to the convex parts of the substrate electrode. Any convexoconcave shape can be formed on the surface of the electrode substrate. This allows the openings formed in the thin film electrode to have any shape, accordingly.

Such use of the electrode substrate having the convexoconcave surface in the electron emission element makes it possible to easily form the openings in the thin film electrode with a high control accuracy. The electron emission element, which has the openings in the thin film electrode, can further improve an electron emission efficiency, compared to a conventional electron emission element having no opening.

In order to attain the object, a method of an embodiment of the present invention for manufacturing an electron emission element is arranged to be a method for manufacturing an electron emission element which includes an electrode substrate, a thin film electrode, and an electron accelerating layer that contains at least insulating fine particles, the electron emission element emitting, from the thin film electrode, electrons which are accelerated between the electrode substrate and the thin film electrode by voltage application across the electrode substrate and the thin film electrode, the method including the steps of: (a) forming the electron accelerating layer on the electrode substrate; (b) forming the thin film electrode on the electron accelerating layer; and (c) forming openings in the thin film electrode, the electrode substrate having a convexoconcave surface on which the electron accelerating layer is provided, and in the step (c), the opening being formed above convex parts of the electrode substrate in the thin film electrode by voltage application across the substrate electrode having the convexoconcave surface and the thin film electrode.

According to the arrangement, the electron accelerating layer, which is formed on the convexoconcave surface of the electrode substrate so as be flat for manufacture of the electron emission element, is thick in a concave part of the electrode substrate but thin above the convex parts of the electrode substrate. Voltage application across the electrode substrate having the convexoconcave surface and the thin film electrode forms an electric field in the electron accelerating layer above the convexoconcave surface of the electrode substrate. The electric field is stronger above the convex parts (where the electron accelerating layer is thinner) of the electrode substrate than in the concave part of the electrode substrate.

The electric field which is stronger above the convex parts of the electrode substrate dielectrically breaks down the electron accelerating layer above the convex parts of the electrode substrate, whereby the openings are formed in the thin film electrode so as to correspond to the convex parts of the substrate electrode. Any convexoconcave shape can be formed on the surface of the electrode substrate. This allows the openings formed in the thin film electrode to have any shape, accordingly.

Such use of the electrode substrate having the convexoconcave surface for manufacture of the electron emission element makes it possible to (i) easily form the openings in the thin film electrode with a high control accuracy and (ii) manufacture an electron emission element having an improved electron emission efficiency.

Advantageous Effects of Invention

An electron emission element of the present invention thus has openings in a thin film electrode, thereby improving an electron emission efficiency. Further, use of an electrode substrate having a convexoconcave surface in the electron emission element makes it possible to easily form the openings in the thin film electrode with a high control accuracy.

DESCRIPTION OF EMBODIMENTS

The following describes embodiments and examples of an electron emission element and an electron emission device of the present invention, with reference to FIGS. 1 through 11. Note, however, that the embodiments and the examples described below are just concrete examples of the present invention, and therefore do not limit the present invention at all.

Embodiment 1

Figure 1:
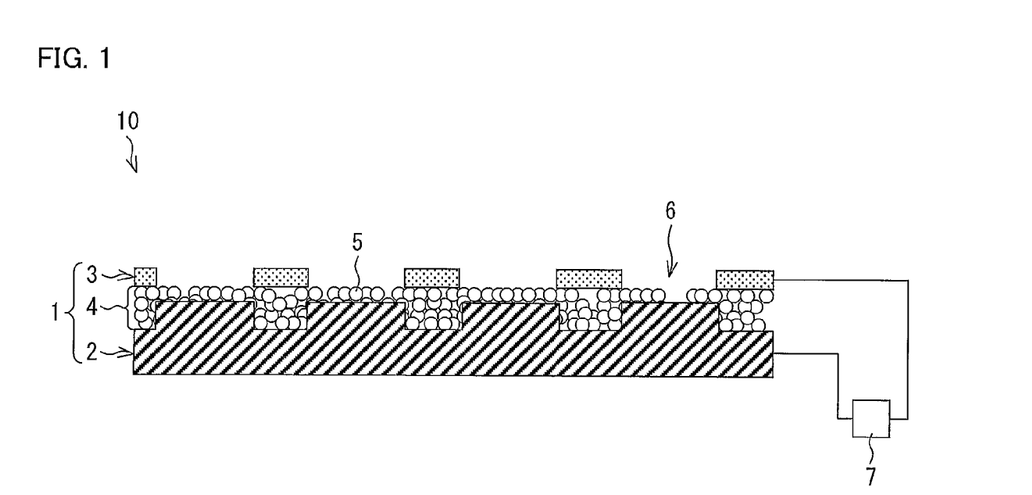
FIG. 1 is a cross-sectional view illustrating a configuration of an electron emission device which employs an electron emission element in accordance with an embodiment of the present invention.
Figure 2:
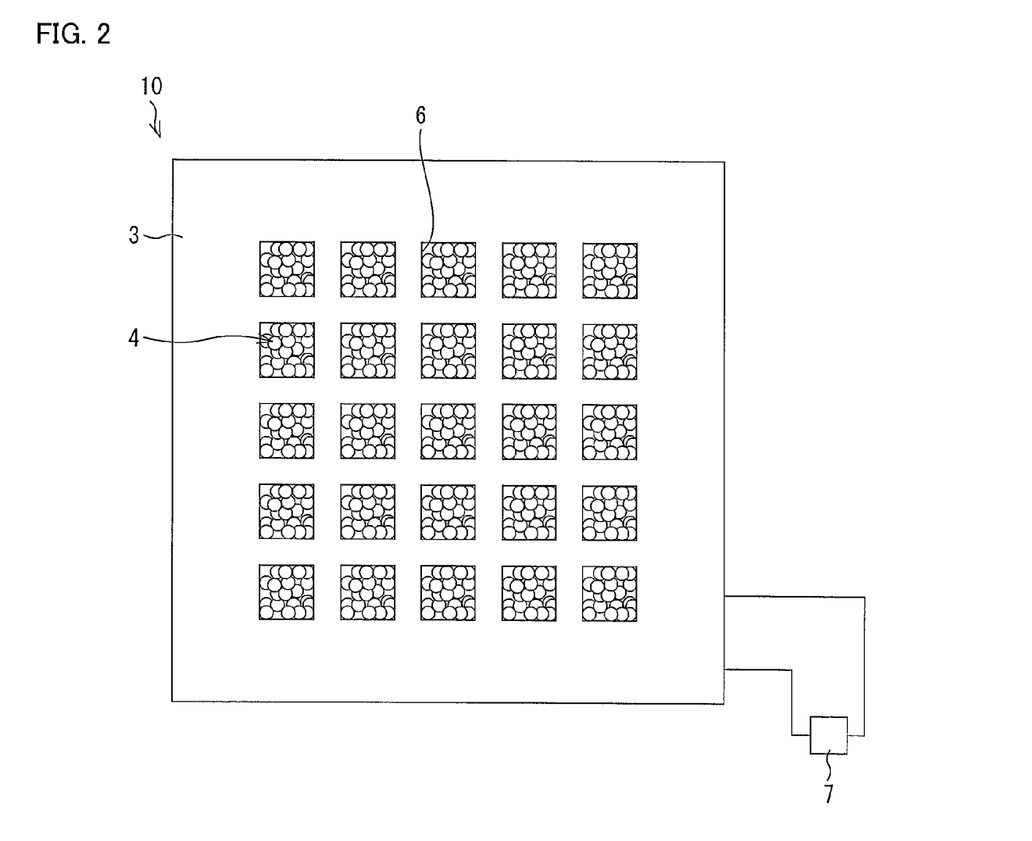
FIG. 2 is a top view illustrating the configuration of the electron emission device which employs the electron emission element in accordance with the embodiment of the present invention.

FIG. 1 is a cross-sectional view illustrating a configuration of an electron emission device 10 which employs an electron emission element 1 of Embodiment 1 of the present invention. FIG. 2 is a top view illustrating the configuration of the electron emission device 10.

As illustrated in FIGS. 1 and 2, the electron emission device 10 includes (i) the electron emission element 1 of Embodiment 1 of the present invention and (ii) an electric power supply 7 (electric power supplying section).

(Configuration of Electron Emission Element 1)

As illustrated in FIG. 1, the electron emission element 1 includes (i) an electrode substrate 2 serving as a lower electrode, (ii) a thin film electrode 3 serving as an upper electrode and (iii) an electron accelerating layer 4 sandwiched between the electrode substrate 2 and the thin film electrode 3. The electrode substrate 2 has a convexoconcave shape (see FIG. 1). The electron accelerating layer 4 is a layer in which monodisperse insulating fine particles are aligned so as to fill the layer. That is, the electron accelerating layer 4 is an insulating fine particle layer. The electron emission element 1 thus configured above has an electrically semi-conductive transporting property.

The electric power supply 7 is provided for applying a voltage across the electrode substrate 2 and the thin film electrode 3. Application of a voltage across the electrode substrate 2 and the thin film electrode 3 causes (i) electrons to flow as current carriers in the electron accelerating layer 4 and (ii) a high electric field to be formed in the electron accelerating layer 4 which is sandwiched between the electrode substrate 2 and the thin film electrode 3. The high electric field accelerates the electrons which flow between the electrode substrate 2 and the thin film electrode 3. Some of the electrons thus accelerated are emitted as ballistic electrons from the electron accelerating layer 4. The ballistic electrons emitted from the electron accelerating layer 4 are emitted outside of the electron emission element 1 (i) via openings 6 formed in respective parts of the thin film electrode 3, which respective parts correspond to convex parts of the electrode substrate 2 or (ii) by tunneling the thin film electrode 3.

Since the electrode substrate 2 has the convexoconcave shape, the electron accelerating layer 4 has (i) a thick part formed in a concave part of the electrode substrate 2 and (ii) thin parts formed above the respective convex parts of the electrode substrate 2. Note here that a thickness of the electron accelerating layer 4 is defined as a thickness of the thick part of the electron accelerating layer 4, which thick part is formed in the concave part of the electrode substrate 2.

(Electrode Substrate 2)

The electrode substrate 2 is provided for applying a voltage to the electrode accelerating layer 4 in cooperation with the thin film electrode 3. The electrode substrate 2 further serves as a support of the electron emission element 1. Therefore, the electrode substrate 2 should be made from a material which has (i) some strength, (ii) a favorable adhesiveness to a material which makes in a direct contact with the electrode substrate 2 and (iii) a moderate conductivity. Specific examples of the electrode substrate 2 encompass (i) a metallic substrate of stainless steel, aluminum, titanium or copper and (ii) a semiconductor substrate of silicon, germanium or gallium arsenide.

A height of each of the convex parts (a depth of the concave part) formed on a surface of the electrode substrate 2 is preferably 50% through 80% of the thickness of the electron accelerating layer 4. This prevents the electrode substrate 2 and the thin film electrode 3 to be short-circuited by forming the openings 6 in the thin film electrode 3.

A shape of the openings 6 is spontaneously determined in accordance with the convexoconcave shape of the electrode substrate 2. Therefore, openings 6 having a desired shape, size, and denseness can be formed by patterning convex parts of the electrode substrate 2 so as to have patterns of the openings 6.

The electrode substrate 2 is limited to neither its shape nor size. It is, however, preferable that the electrode substrate 2 has as many convex parts as possible because the electron emission element 1 can efficiently emit electrons from as many openings 6.

The electrode substrate 2 can be an insulating substrate other than the metallic substrate and the semiconductor substrate, such as a glass substrate or a plastic substrate. An insulating substrate having a convexoconcave surface serves as a support of the electron emission element 1. In a case where the insulating substrate is employed as the electrode substrate 2, a thin film electrode made of an electrically conductive material such as a metal should be formed on the convexoconcave surface of the insulating substrate (on an interface between the insulating substrate and the electron accelerating layer 4).

A material for the thin film electrode is not limited to a specific one, provided that the material is an excellent electrically conductive material which can be formed in a thin film shape. Note, however, that in a case where the electron emission element 1 should stably operate in the air, the material for the thin film electrode is preferably an electrically conductive material having a high antioxidative property, and is more preferably noble metals.

In accordance with an application of the electron emission element 1, a thin film of indium tin oxide (ITO) is suitably employable, which is in widespread use as an oxidation conductive material for a transparent electrode.

Alternatively, in terms of formation of a strong thin film, the thin film electrode can be, for example, a glass substrate having a surface of a thin metallic film in which a titanium of 200 nm in thickness and a copper of 1000 nm in thickness are formed in this order. However, the thin film electrode is limited to neither such materials nor such numeric values.

(Thin Film Electrode 3)

The thin film electrode 3 is provided for applying a voltage to the electrode accelerating layer 4 in cooperation with the electrode substrate 2. Therefore, a material for the thin film electrode 3 is not limited to a specific one, provided that the material is an electrically conductive material which can apply a voltage to the electrode accelerating layer 4. Note, however, that in a case where the electron emission element 1 is assumed to operate in the air, the thin film electrode 3 is most preferably made of gold which becomes neither an oxide nor a sulfide. Silver, palladium, tungsten and other materials, which are relatively unlikely to become an oxide, can also be practically used without any problems.

According to the electron emission element 1, the openings 6 are formed in the thin film electrode 3 (see FIGS. 1 and 2). Via the openings 6, ballistic electrons accelerated in the electron accelerating layer 4 are emitted outside of the electron emission element 1 without tunneling the thin film electrode 3. That is, formation of the openings 6 in the thin film electrode 3 increases an electron emission efficiency of the electron emission element 1.

A thickness of the thin film electrode 3 is significant as a condition under which electrons are efficiently emitted outside of the electron emission element 1. The thickness of the thin film electrode 3 preferably falls within a range of 10 nm through 55 nm. The thin film electrode 3 should have a thickness of at least 10 nm so as to function as a flat electrode in the electron emission element 1. A thin film electrode 3 having a thickness of less than 10 nm cannot have a sufficient electric conductivity as the flat electrode. Further, the thin film electrode 3 should have a thickness of not more than 55 nm so that the electron emission element 1 can emit electrons outside. A thin film electrode 3 having a thickness of more than 55 nm causes (i) a tunnel probability of ballistic electrons to be remarkably decreased or (ii) electrons to be recaptured by the electron accelerating layer 4 due to reflection of the electrons on an interface between the electron accelerating layer 4 and the thin film electrode 3. This ultimately decreases the electron emission efficiency at which the electron emission element 1 emits electrons outside.

(Electron Accelerating Layer 4)

The electron accelerating layer 4 is not limited to a specific one, provided that the electron accelerating layer 4 contains at least insulating fine particles 5. The insulating fine particles 5 each have a diameter (average diameter) of preferably 5 nm through 1000 nm, and more preferably 15 nm through 500 nm. This allows the electron accelerating layer 4 to efficiently radiate joule heat which is generated by flowing of current in the electron accelerating layer 4. It is therefore possible to prevent the electron emission element 1 from being destroyed by heat which is generated during operation of the electron emission element 1. Further, change in the thickness of the electron accelerating layer 4 makes it possible to freely and easily adjust a resistance of the electron emission element 1.

Examples of a practical material for the insulating fine particles 5 encompass silicon oxide, aluminum oxide, and titanium oxide. A commercially available product of the practical material is colloidal silica manufactured and distributed by, for example, NISSAN CHEMICAL INDUSTRIES, LTD.

The thickness of the electron accelerating layer 4 preferably falls within a range of 8 nm through 3000 nm. Such thickness makes it possible to (i) level off a surface of the electron accelerating layer 4 and (ii) control, along a layer thickness direction of the electron accelerating layer 4, a resistance of the electron accelerating layer 4. The thickness of the electron accelerating layer 4 more preferably falls within a range of 30 nm through 1000 nm.

(Method for Manufacturing Electron Emission Element 1)

The following describes an embodiment of a method for manufacturing the electron emission element 1. The method includes the steps of (i) forming a convexoconcave shape on a surface of an electrode substrate 2, (ii) carrying out a hydrophilic treatment on the electrode substrate 2, (iii) forming an electron accelerating layer 4, (iv) forming a thin film electrode 3, and (v) forming openings 6 in the thin film electrode 3.

The electrode substrate 2 is one of a metallic substrate, a semiconductor substrate, and an insulating substrate.

(Formation of Convexoconcave Shape on Surface of Electrode Substrate 2)

The convexoconcave shape is formed on the surface of the electrode substrate 2. For example, in a case where an aluminum substrate is employed as the electrode substrate 2, the aluminum substrate can be etched by means of reactive ion etching (RIE) which utilizes a mixture of $BCl_3$ gas and $Cl_2$ gas. A desired convexoconcave shape is formed on the surface of the electrode substrate 2 by patterning to define a part to be etched and a part not to be etched.

In a case where an insulating substrate is employed as the electrode substrate 2, a convexoconcave shape is formed on a surface of the insulating substrate, and then a film of an electrically conductive material is formed on the surface of the insulating substrate. The insulating substrate is thus completed as the electrode substrate 2.

(Formation of Electron Accelerating Layer 4)

The electron accelerating layer 4 is formed on the surface of the electrode substrate 2. The electron accelerating layer 4 is made up of an insulating fine particle layer which contains at least insulating fine particles 5. The electron accelerating layer 4 can further contain electrically conductive fine particles in addition to the insulating fine particles 5. According to the electron emission element 1 exemplified in Embodiment 1, the electron accelerating layer 4 is made up of only the insulating fine particle layer which contains the insulating fine particles 5. The following describes the hydrophilic treatment on the electrode substrate 2, and formation of the insulating fine particle layer.

(Hydrophilic Treatment on Electrode Substrate 2, and Formation of Insulating Fine Particle Layer)

A thin film of the insulating fine particles 5 is formed on the electrode substrate 2 by use of an insulating fine particle disperse solution. The insulating fine particle disperse solution is a solvent, such as water, in which monodisperse insulating fine particles 5 are dispersed. The insulating fine particle disperse solution is applied onto the electrode substrate 2, and then the insulating fine particles 5 are accumulated in a layer shape by a spin coat method.

In a case where the thin film of the insulating fine particles 5 is to be formed on the electrode substrate 2, an attention should be paid to a polarity of the electrode substrate 2. Generally, the electrode substrate 2 is hydrophobic, and in contrast, the insulating fine particle disperse solution is hydrophilic. The polarity of the electrode substrate 2 is thus opposite to that of the insulating fine particle disperse solution. Therefore, the insulating fine particle disperse solution which is applied onto the electrode substrate 2 is repelled on the surface of the electrode substrate 2. Even in a case where such repelled insulating fine particle disperse solution is spin-coated, the insulating fine particles 5 are not accumulated on the electrode substrate 2.

It is therefore necessary to make the surface of the electrode substrate 2 hydrophilic so as to improve a wettability of the insulating fine particle disperse solution to the electrode substrate 2. The surface of the electrode substrate 2 is made hydrophilic by carrying out an ultraviolet treatment on the surface of the electrode substrate 2. The ultraviolet treatment is not limited to a specific one. Therefore, for example, the surface of the electrode substrate 2 is irradiated with ultraviolet rays in a vacuum of 20 Pa for 10 minutes.

It is preferable that a solid content of the insulating fine particle disperse solution to be spin-coated for formation of the insulating fine particle layer is not less than 10 wt % but not more than 50 wt %. An insulating fine particle disperse solution having a solid content of less than 10 wt % has a too low viscosity. Therefore, insulating fine particles 5 of such an insulating fine particle disperse solution cannot be accumulated on the electrode substrate 2. In contrast, an insulating fine particle disperse solution having a solid content of more than 50 wt % has a too high viscosity. Therefore, insulating fine particles 5 of such an insulating fine particle disperse solution agglomerate. This ultimately makes it impossible to form a thin and flat film of the insulating fine particles 5 on the electrode substrate 2.

A condition under which the insulating fine particle disperse solution is spin-coated on the electrode substrate 2 is not particularly limited. Therefore, for example, the insulating fine particle disperse solution is spin-coated at 500 revolutions per minute (rpm) for 5 seconds, and then spin-coated at 3000 through 4500 rpm for 10 seconds. An amount of the insulating fine particle disperse solution to be applied is not particularly limited, either. However, for example, not less than 0.2 mL/cm$^2$ of the insulating fine particle disperse solution is preferably applied to the electrode substrate 2.

The insulating fine particle layer formed under the above conditions has a thickness suitable for use in the electron emission element 1. Further, the insulating fine particle layer formed under the conditions is filled with the insulating fine particles 5 so as to be flat on the electrode substrate 2. That is, the electron accelerating layer 4 is thick in the concave part of the electrode substrate 2, and thin above the convex parts of the electrode substrate 2. The surface of the electron accelerating layer 4 is so flat that the electron emission element 1 can be prepared.

Examples of the insulating fine particle disperse solution to be used for formation of the insulating fine particle layer encompass hydrophilic silica disperse solutions manufactured by NISSAN CHEMICAL INDUSTRIES, LTD., such as Colloidal Silica MP-4540 (average particle diameter of 450 nm, 40 wt %), Colloidal Silica MP-3040 (average particle diameter of 300 nm, 40 wt %), Colloidal Silica MP-1040 (average particle diameter of 100 nm, 40 wt %), Colloidal Silica SNOWTEX (registered trademark) 20 (average particle diameter of 15 nm, 20 wt %), and Colloidal Silica SNOWTEX SX (average particle diameter of 5 nm, 20 wt %).

(Formation of Thin Film Electrode 3)

Figure 3:
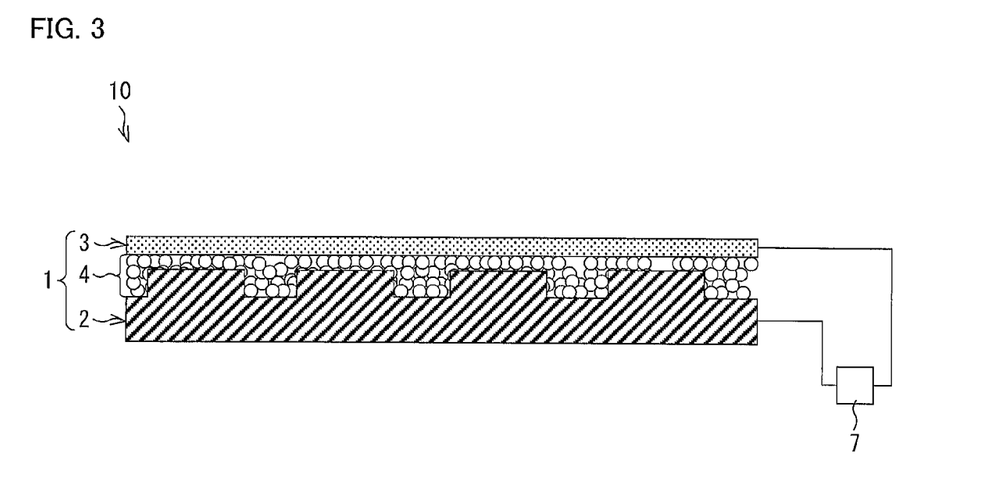
FIG. 3 is a cross-sectional view illustrating the configuration of the electron emission device (where no opening is formed) which employs the electron emission element in accordance with the embodiment of the present invention.

The thin film electrode 3 is formed on the surface of the electron accelerating layer 4 by means of, for example, magnetron sputtering. This completes an electron emission element in which no opening has been formed. FIG. 3 is a cross-sectional view illustrating the electron emission element in which no opening has been formed.

How to form the thin film electrode 3 is not limited to the magnetron sputtering but can be a method such as an ink jet method, a spin coat method or a vapor deposition method.

(Formation of Openings 6)

A voltage is applied across the electrode substrate 2 and the thin film electrode 3 so as to form the openings 6 in the electron emission element (i) in which no opening has been formed and (ii) which has been prepared by the above steps. The following deals with how the openings 6 are formed.

The electron accelerating layer 4 of the electron emission element illustrated in FIG. 3 is thinner above the convex parts of the electrode substrate 2 than in the concave part of the electrode substrate 2. Therefore, a field intensity of an electric field formed above the convex parts in the electron accelerating layer 4 is higher than that of an electric field formed in the concave part in the electron accelerating layer 4. This causes the electron accelerating layer 4 above the convex parts to be dielectrically broken down, whereby the openings 6 are spontaneously formed in the thin film electrode 3 so as to correspond to the convex parts of the substrate electrode 2.

According to the above method, the openings 6 can thus be easily formed at desired locations with a high control accuracy. This ultimately makes it possible to manufacture an electron emission element 1 for efficiently emitting ballistic electrons from the openings 6.

Example 1

The following describes Example 1 of the electron emission element 1 of the present invention.

An aluminum substrate 25 mm square was employed as an electrode substrate 2. The aluminum substrate was etched by means of RIE which utilizes a mixture of BCl$_3$ gas and Cl$_2$ gas so that the electrode substrate 2 had a convexoconcave surface in which (i) a concave part is 600 nm deep and (ii) each convex part has a planar square top surface of 0.01 mm$^2$. Then, the electrode substrate 2 was irradiated with ultraviolet rays for 10 minutes in a vacuum of 20 Pa, so that a hydrophilic treatment was carried out on the substrate electrode 2.

Next, 1 mL of Colloidal Silica MP-1040 (average particle diameter of 100 nm, 40 wt %) manufactured by NISSAN CHEMICAL INDUSTRIES, LTD. was (i) dropped on the electrode substrate 2 as an insulating fine particle disperse solution, and (ii) applied over the electrode substrate 2 by a spin coat method. Specifically, the electrode substrate 2 was first spin-coated for 5 seconds during which a rev. was gradually increased from 0 rpm to 3000 rpm, and then spin-coated at 3000 rpm for 10 seconds.

This formed an electron accelerating layer 4 made up of an insulating particle layer in which monodisperse insulating fine particles 5 were aligned so as to fill the insulating particle layer. The electron accelerating layer 4 had a thickness of 900 nm.

Next, a thin film electrode 3 of gold was formed by use of a magnetron sputtering device so as to have a thickness of 40 nm and a surface area of 0.01 cm$^2$ on a surface of the electron accelerating layer 4.

Last, by applying a voltage across the electrode substrate 2 and the thin film electrode 3, openings 6 were formed (i) in thin parts of the electron accelerating layer 4 and in the thin film electrode 3 and (ii) on the convex parts of the substrate electrode 2.

Since the electron emission element 1 manufactured by the above steps (i) had the openings 6 in the thin film electrode 3 due to the convexoconcave surface of the electrode substrate 2 and (ii) included the electron accelerating layer 4 whose surface is flat, the electron emission element 1 efficiently emitted electrons with a high control accuracy from desired parts of a whole surface of the electron emission element 1. That is, the electron emission element 1 had a favorable electron emission property over the whole surface.

Embodiment 2

Charge Device 90

Figure 4:
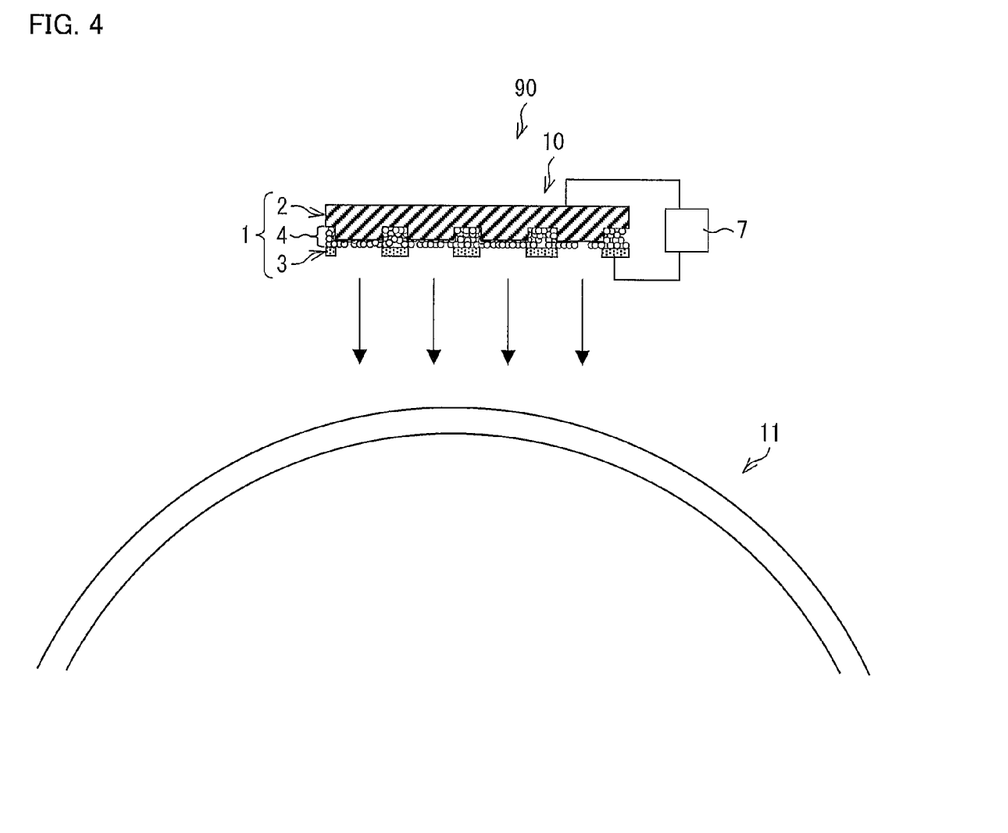
FIG. 4 is a diagram exemplifying a charge device which employs the electron emission device of FIG. 1.

FIG. 4 is a diagram exemplifying a charge device, of the present invention, which includes the electron emission device 10 of Embodiment 1 of the present invention. A charge device 90 includes (i) an electron emission device 10 which includes an electron emission element 1, and an electric power supply 7 for applying a voltage to the electron emission element 1 and (ii) a photosensitive drum 11. An image forming device of the present invention includes the charge device 90.

The electron emission element 1 is provided so as to face the photosensitive drum 11 to be charged, in the charge device 90 of the image forming device of the present invention. The electric power supply 7 applies a voltage to the electron emission element 1. This causes the electron emission element 1 to emit electrons to a surface of the photosensitive drum 11 so that the surface is charged. Note here that the electron emission element 1 is preferably separated from the surface of the photosensitive drum 11 by, for example, 3 mm through 5 mm in the charge device 90. Further, it is preferable that the voltage is approximately 25 V. An electron accelerating layer 4 of the electron emission element 1 can be configured to emit 1 μA/cm$^2$ of electrons per unit time on receipt of 25 V which is applied by the electric power supply 7, for example.

Note that components, other than the charge device 90, of the image forming device of the present invention can be conventionally well-known members. The electron emission element 1 has a high electron emission efficiency. This allows the charge device 90 to efficiently charge the photosensitive drum 11.

The electron emission element 1 provided in the charge device 90 forms no electric field outside of the electron emission element 1. This causes no electric discharge even in a case where the electron emission element 1 operates in the air. Therefore, the charge device 90 generates no ozone even in a case where the charge device 90 is used in the air. Ozone is harmful to human bodies, and therefore regulated according to various standards to the environment. The charge device 90 which generates no ozone contributes to an increase in flexibility in design of the image forming device.

Even in a case where a conventional charge device is designed to emit no ozone outside of the conventional charge device, ozone generated in the conventional charge device oxidizes and deteriorates organic materials, such as a photosensitive drum 11 and a belt, in the conventional charge device. Such a problem of ozone generation with an image forming device can be solved by replacing the conventional charge device with the charge device 90 which includes the electron emission device 10 which includes the electron emission element 1 of the present invention.

The electron emission element 1 provided in the charge device 90 is a planar electron emission source. Therefore, the charge device 90 can charge the photosensitive drum 11 widely along a rotational direction of the photosensitive drum 11. This means that a specific part of the photosensitive drum 11 can be irradiated with electrons for a long period of time so as be charged. The charge device 90 including the planar electron emission source charges more uniformly than a wire charge device for linearly charging.

The electron emission element 1 requires approximately 10 V to be applied so that the charge device 90 charges the photosensitive drum 11. Meanwhile, a wire charge device which employs a corona discharge device requires several kilovolts to be applied so as to charge a photosensitive drum. As such, the charge device 90 including the electron emission element 1 operates with a remarkably lower voltage, compared to the wire charge device including the corona discharge device.

Embodiment 3

Electron Radiation Curing Device 100

Figure 5:
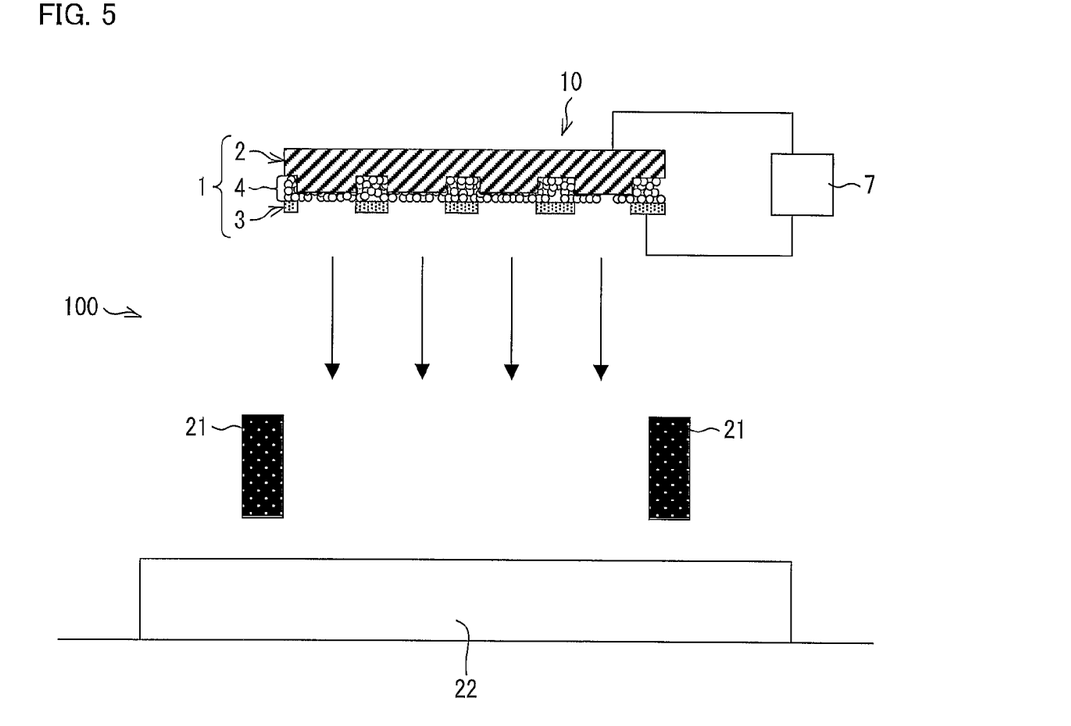
FIG. 5 is a diagram exemplifying an electron radiation curing device which employs the electron emission device of FIG. 1.

FIG. 5 is a diagram exemplifying an electron radiation curing device which includes the electron emission device 10 of Embodiment 1 of the present invention. An electron radiation curing device 100 includes (i) an electron emission device 10 which includes an electron emission element 1, and an electric power supply 7 for applying a voltage to the electron emission element 1 and (ii) an acceleration electrode 21 for accelerating emitted electrons.

The electron radiation curing device 100 includes the electron emission element 1 as an electron emission source. The emitted electrons are accelerated by the acceleration electrode 21 so as to collide with a resist 22. The resist 22 thus collides with the emitted electrons absorbs an electron beam energy, thereby being cured.

A general resist can be cured with an energy of not more than 10 eV. According to Embodiment 3, the emitted electrons have an energy of not less than 10 eV. Therefore, there is no need to further accelerate the emitted electrons in terms of simply curing the resist 22. Meanwhile, it is known that how deep an electron beam penetrates a resist depends on an energy of the electron beam. An accelerating voltage of approximately 5 kV is required for completely curing, for example, a resist 22 having a thickness of 1 μm along a thickness direction of the resist 22. As such, the acceleration electrode 21 is required for supplying a necessary and sufficient energy to the emitted electrons in accordance with a thickness of the resist 22.

According to a conventional general electron radiation curing device, an electron emission source is sealed in a vacuum, and electrons are emitted from the electron emission source by applying a high voltage (50 kV through 100 kV) to the electron emission source. In a case where the conventional general electron radiation curing device cures a resist in the air, an electron transmission window should be individually provided so as to separate a vacuum layer from the air. Electrons in the vacuum shift to the air via the electron transmission window, and then collide with a target to be irradiated with the electrons. According to such irradiation of the electrons, the electron transmission window absorbs a large amount of energy of emitted electrons in transmitting the emitted electrons. Further, electrons which have reached the resist have an excessively high energy because the electron emission source is a field-emission electron emission element. Most of the electrons having such an excessively high energy pass through the resist. This decreases an energy utilization rate. Moreover, the field-emission electron emission element is a point electron emission source. Therefore, a range to be simultaneously irradiated with electrons is narrow, and throughput is low.

In contrast, the electron radiation curing device 100 of the present invention, which employs the electron emission device 10, can operate in the air, and does not require vacuum sealing. Further, since the electron emission element 1 has a high electron emission efficiency, the electron radiation curing device 100 can efficiently emit electron beams. Furthermore, emitted electrons do not lose their energy because the emitted electrons do not pass through any electron transmission window. This makes it possible to decrease an accelerating voltage for the emitted electrons. Moreover, since the electron emission element 1 is the planar electron emission source, throughput is remarkably high. Further, maskless exposure can be carried out by emitting electrons according to a pattern.

Embodiment 4

Figure 6:
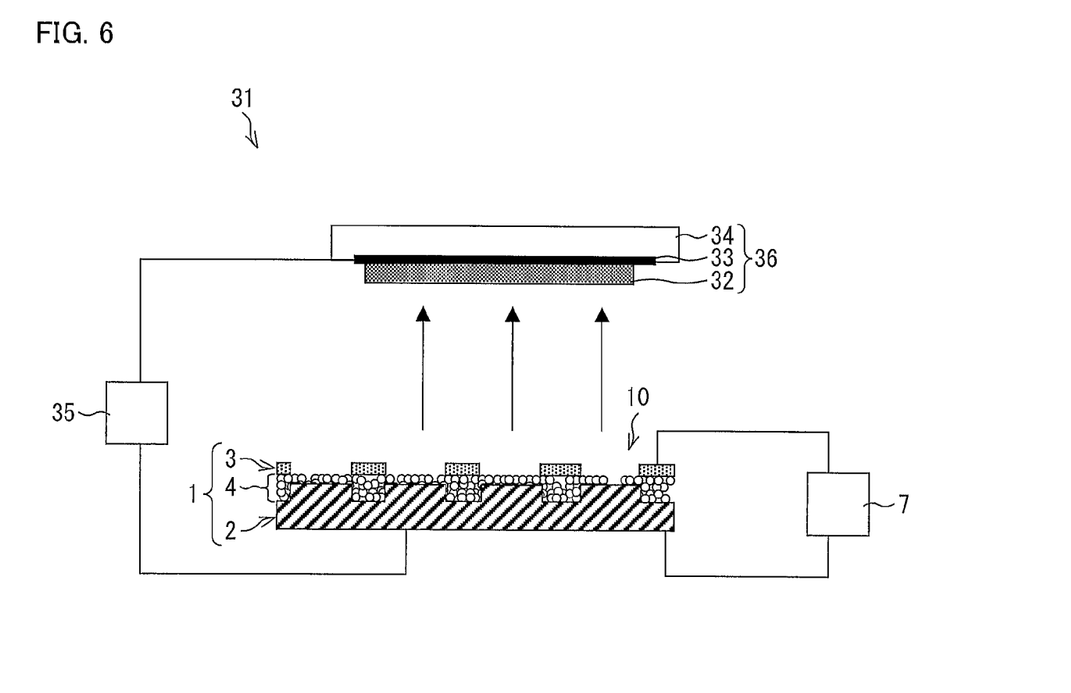
FIG. 6 is a diagram exemplifying a light emitting device which employs the electron emission device of FIG. 1.
Figure 7:
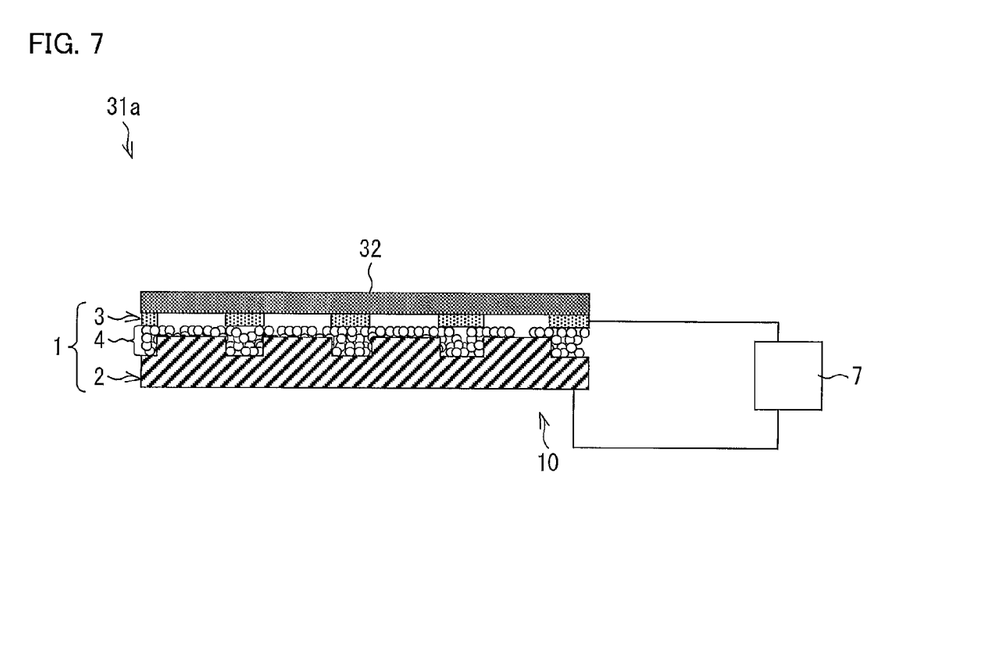
FIG. 7 is a diagram illustrating another example of the light emitting device which employs the electron emission device of FIG. 1.
Figure 8:
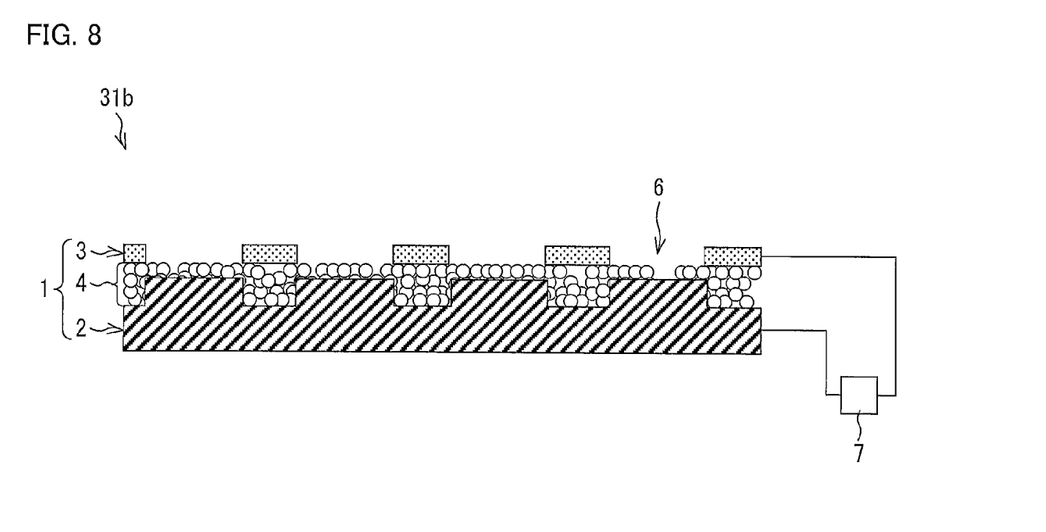
FIG. 8 is a diagram illustrating yet another example of the light emitting device which employs the electron emission device of FIG. 1.
Figure 9:
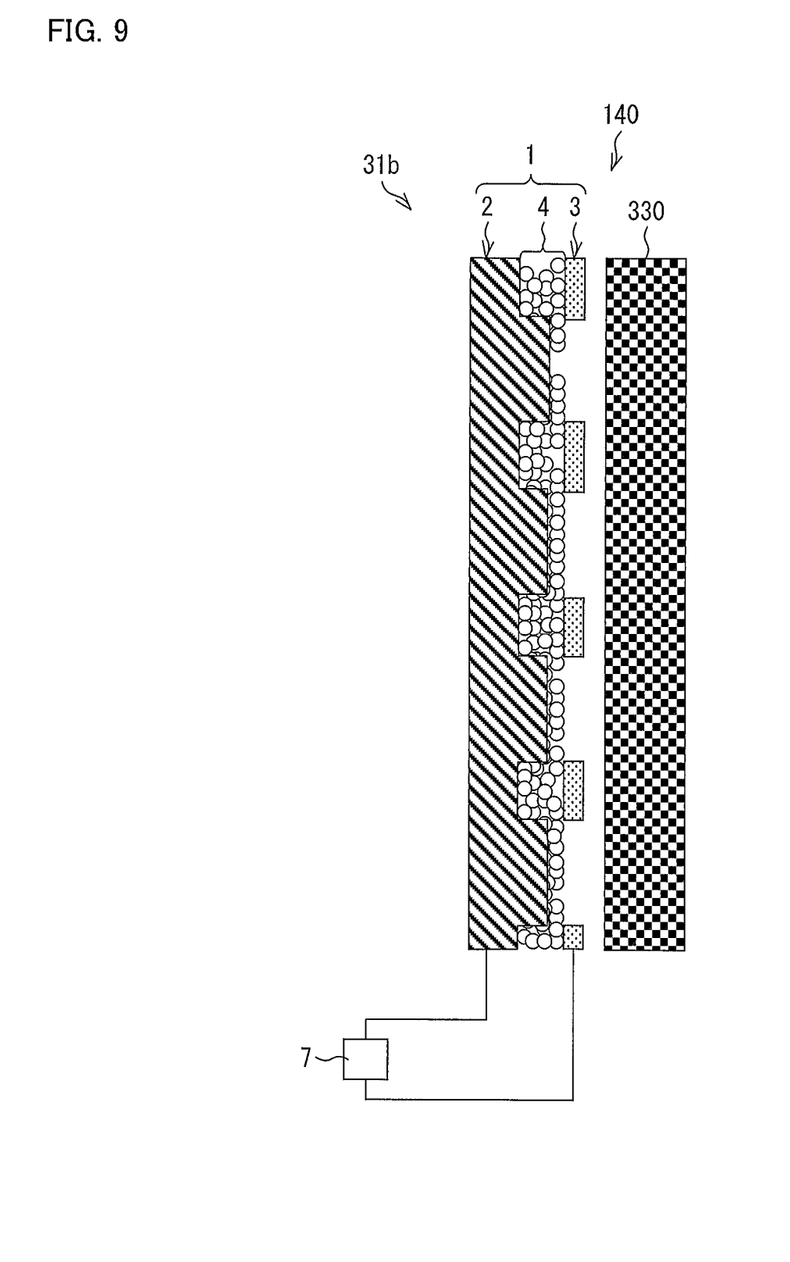
FIG. 9 is a diagram exemplifying an image display device which includes the light emitting device which employs the electron emission device of FIG. 1.

FIGS. 6 through 8 illustrate respective light emitting devices 31, 31a, and 31b of the present invention each of which includes the electron emission device 10 of Embodiment 1 of the present invention.

(Light Emitting Device 31)

The light emitting device 31 illustrated in FIG. 6 includes (i) an electron emission device 10 which includes an electron emission element 1, and an electric power supply 7 for applying a voltage to the electron emission element 1, (ii) a luminescent section 36 which includes a glass substrate 34 which serves as a base material, an ITO thin film 33, and a fluorescent material 32 (luminescent material) and (iii) an electric power supply 35. The luminescent section 36 is provided so as to face and keep a predetermined distance from the electron emission element 1. The electric power supply is provided in the light emitting device 31 for applying a voltage across an electrode substrate 2 of the electron emission element 1 and the ITO thin film 33.

The fluorescent material 32 is suitably made from a red luminescent material, a green luminescent material, and a blue luminescent material, each of which is excited by electrons. Examples of a red fluorescent material encompass $Y_2O_3$:Eu and $(Y,Gd)BO_3$:Eu. Examples of a green fluorescent material encompass $Zn_2SiO_4$:Mn and $BaAl_{12}O_{19}$:Mn. An example of a blue fluorescent material is $BaMgAl_{10}O_{17}$:$Eu^{2+}$.

The fluorescent material 32 formed in the luminescent section 36 preferably has a thickness of approximately 1 μm. The ITO thin film 33 of Embodiment 4 has a thickness of 150 nm. Note, however, that there is no problem as long as the ITO thin film 33 has a thickness which allows a conductivity to be secured. A film of the fluorescent material 32 is formed by use of an application solution which contains a mixture of (i) an epoxy resin which serves as a binder and (ii) fluorescent fine particles. Specifically, the film of the fluorescent material 32 is formed on the ITO thin film 33 by use of the application solution by a conventionally well-known method such as a bar coating method or a dropping method.

In order to increase an emission luminance of the fluorescent material 32, electrons emitted from the electron emission element 1 should be accelerated toward the fluorescent material 32. The electrons are accelerated by applying a voltage across the electrode substrate 2 and the ITO thin film 33 by use of the electric power supply 35. The fluorescent material 32 is preferably separated from the electron emission element 1 by 0.3 mm through 1 mm. Further, it is preferable that (i) the electric power supply 7 applies 18 V to the electron emission element 1 and (ii) the voltage of the electric power supply 35 is 500 V through 2000 V.

(Light Emitting Device 31a)

The light emitting device 31a illustrated in FIG. 7 includes an electron emission element 1, a power supply 7 for applying a voltage to the electron emission element 1, and a fluorescent material 32. The fluorescent material 32 of the light emitting device 31a has a planar shape, and is provided on a top electrode surface of the electron emission element 1. A layer of the fluorescent material 32 is formed on the top electrode surface by use of an application solution which contains (i) fluorescent fine particles and (ii) an epoxy resin which serves as a binder. Note that in a case where the layer of the fluorescent material 32 is formed by a bar coating method, the electron emission element 1 is possibly destroyed because the electron emission element 1 itself is easily destroyed by an external force. Therefore, the layer of the fluorescent material 32 is suitably formed by a method such as a dropping method or a spin coat method.

(Light Emitting Device 31b)

The light emitting device 31b illustrated in FIG. 8 is different from a light emitting device 10 in that fluorescent fine particles are mixed in an electron accelerating layer 4 of an electron emission element 1 of the light emitting device 31b, though the light emitting device 31b is identical to the light emitting device 10 in that each of the light emitting device 31b and the light emitting device 10 includes the electron emission device 1 and an electric power supply 7 for applying a voltage to the light emitting element 1. In the electron accelerating layer 4 of the electron emission element 1 of the light emitting device 31b, some of insulating fine particles 5 can be replaced with the fluorescent fine particles.

In order to increase an emission luminance of the light emitting device 31b, a mixture ratio of the fluorescent fine particles to the insulating fine particles in the electron accelerating layer 4 should be increased. However, the mixture ratio has an upper limit as set forth in the reason below. Generally, fluorescent fine particles have a low resistivity. Therefore, an increase in a mixture ratio of the fluorescent fine particles in an electron accelerating layer 4 causes a decrease in a resistivity of the electron accelerating layer 4. In order that the electron accelerating layer 4 functions to accelerate electrons, the electron accelerating layer 4 should have a resistivity higher than a predetermined resistivity. On this account, there is an optimal mixture ratio of the fluorescent fine particles to be substituted for some of the insulating fine particles 5 in the electron accelerating layer 4. For example, in a case where (i) spherical silica particles (each of which has an average particle diameter of 110 nm) are employed as the insulating fine particles 5 and (ii) ZnS:Mg (which has an average particle diameter of 500 nm) is employed as the fluorescent fine particles, an optimal mixture ratio by weight of the spherical silica particles to the ZnS:Mg is approximately 3 to 1.

(Summary of Light Emitting Devices)

Each of the light emitting devices 31 and 31a emits light by colliding, with the fluorescent material 32, electrons emitted from the electron emission element 1. The light emitting device 31b emits light by colliding, with the fluorescent fine particles, electrons accelerated in the electron accelerating layer 4.

Since the electron emission element 1 has a high electron emission efficiency, each of the light emitting devices 31, 31a, and 31b can efficiently emit light. Further, each of the light emitting devices 31, 31a, and 31b can operate in the air because each of the light emitting devices 31, 31a, and 31b employs the electron emission element 1 as an electron emission source. Sealing each of the light emitting devices 31, 31a, and 31b in a vacuum makes it possible to increase an electron emission current. This allows each of the light emitting devices 31, 31a, and 31b to further efficiently emit light.

(Image Display Device 140)

The following describes an example of an image display device, of the present invention, which includes the light emitting device of the present invention. An image display device 140 illustrated in FIG. 9 includes a light emitting device 31b and a liquid crystal panel 330. The light emitting device 31b is provided behind the liquid crystal panel 330 so as to serve as a backlight in the image display device 140. In a case where the light emitting device 31b is provided in the image display device 140, it is preferable that an electric power supply 7 applies 20 V through 35 V to the light emitting device 31b. The light emitting device 31b can be configured to emit, for example, 10 μA/cm² of electrons per unit time on receipt of 20 V through 35 V which is applied by the electric power supply 7. The light emitting device 31b is preferably separated from the liquid crystal panel 330 by approximately 0.1 mm.

(Other Image Display Device)

An image display device, in which a plurality of light emitting devices 31 illustrated in FIG. 6 are provided in a matrix manner, can be produced. The image display device utilizes emission of light from fluorescent materials which are irradiated with electrons emitted from electron emission elements. Therefore, the image display device is broadly referred to as a field emission display (FED). It is preferable that the electric power supply 6 applies 20 V through 30 V to each of the plurality of light emitting devices 31. Each of the light emitting devices 31 can be configured to emit, for example, 10 µA/cm² of electrons per unit time on receipt of 20 V through 35 V which is applied by the electric power supply 6.

Embodiment 5

Figure 10:
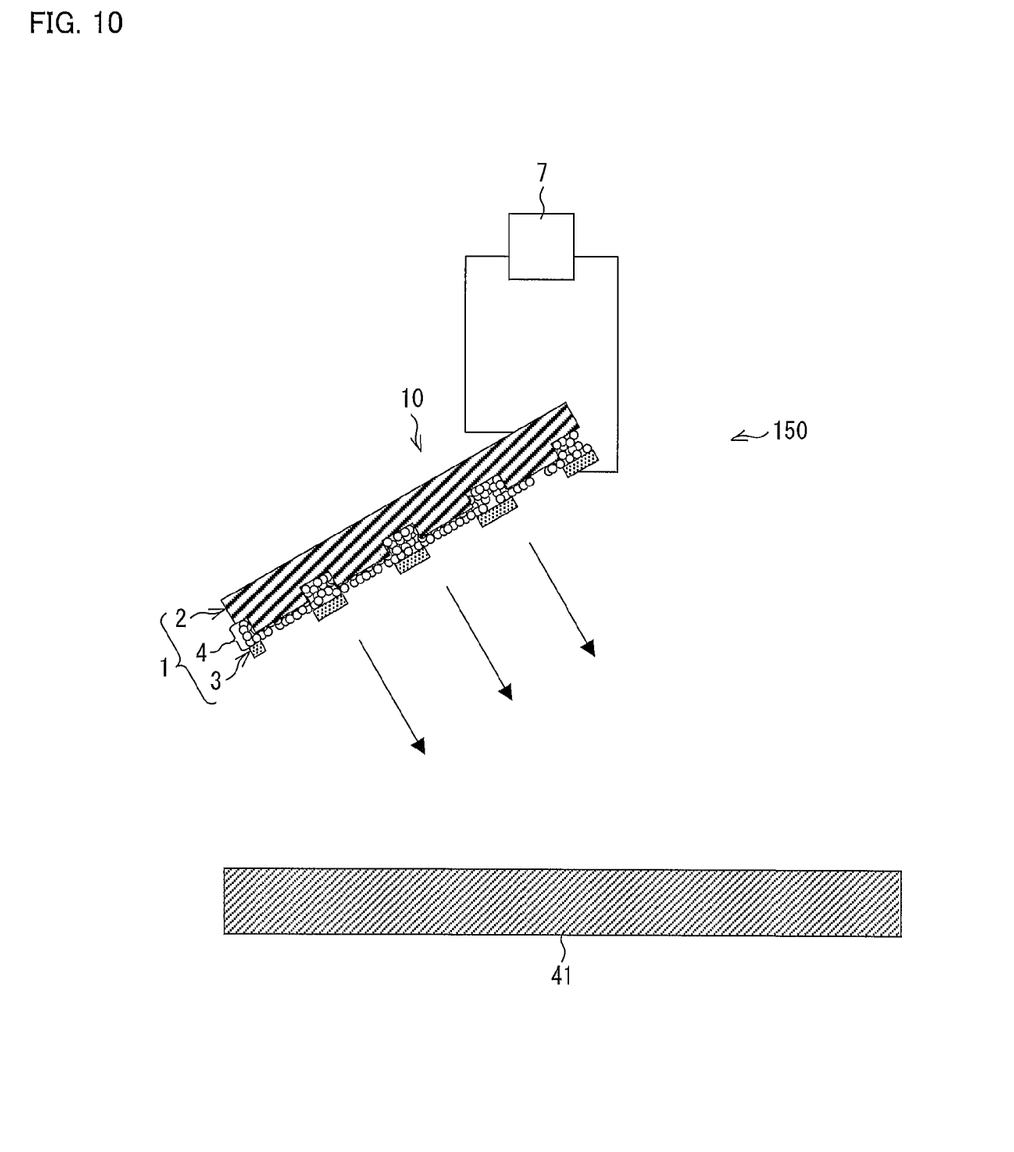
FIG. 10 is a diagram exemplifying (i) an air blower device which employs the electron emission device of FIG. 1 and (ii) a cooling device which includes the air blower device.
Figure 11:
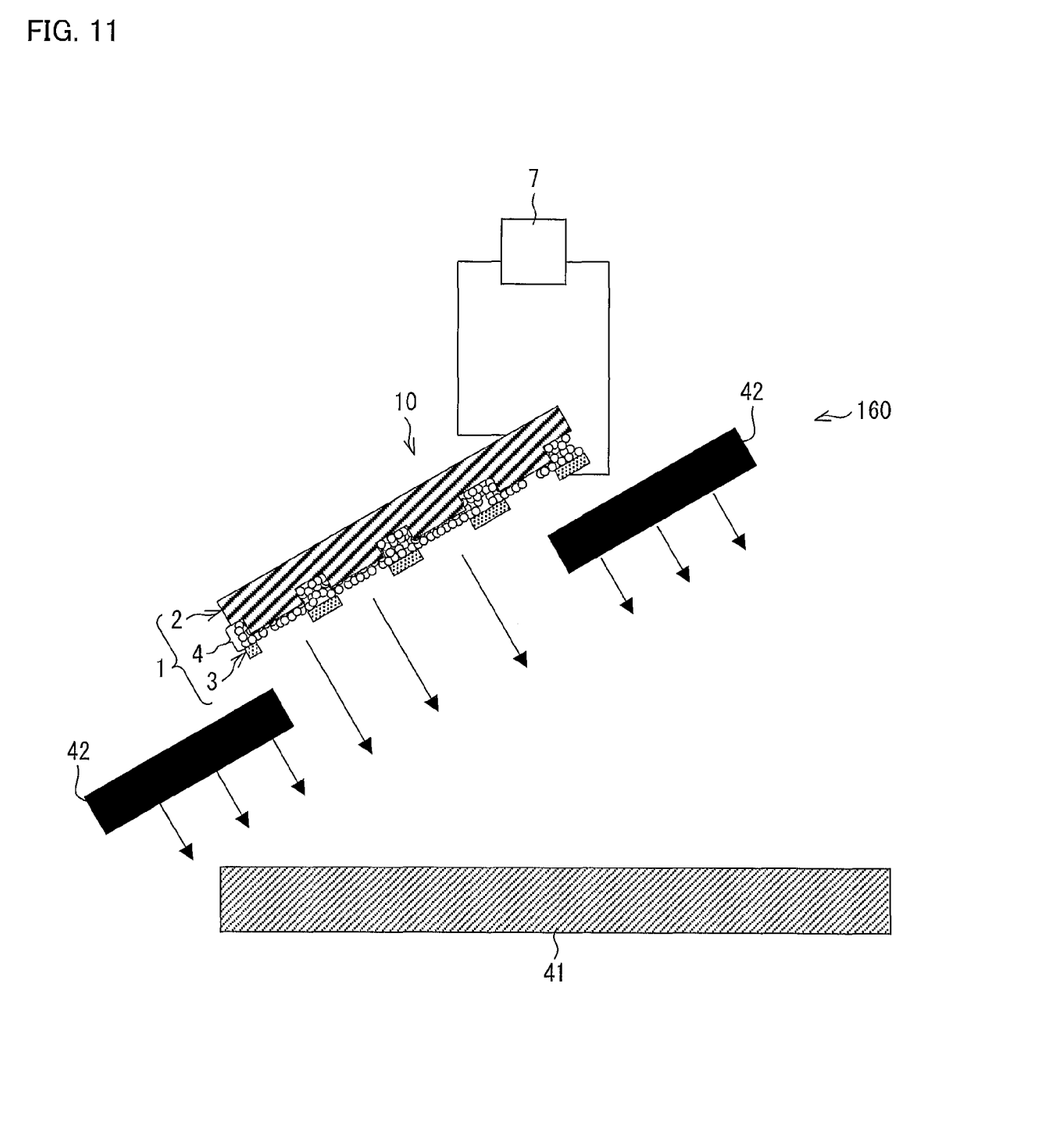
FIG. 11 is a diagram illustrating another example of (i) the air blower device which employs the electron emission device of FIG. 1 and (ii) the cooling device which includes the air blower device.

FIGS. 10 and 11 each are a diagram exemplifying an air blower device, of the present invention, which includes the electron emission device 10 of Embodiment 1 of the present invention. The following describes a case where the air blower device of the present invention is employed as a cooling device. However, an application of the air blower device is not limited to the cooling device.

(Air Blower Devices 150 and 160)

A conventional air blower device or cooling device cools a target to be cooled, merely by sending a normal air to the target. In the case, a flow rate of an air on a surface of the target becomes zero. That is, in the case, part of the air, which part can remove most amount of heat from the target, is not replaced. This decreases a cooling efficiency. An effective way of increasing the cooling efficiency is that not the normal air but an air, which contains charged particles such as electrons and ions, is sent to the target. This is because the air, which (i) contains the charged particles and (ii) has been sent near the target, is attracted to the surface of the target by electrostatic power, and replaces an air which has already been present on the surface of the target.

The following describes examples of the air blower device, of the present invention, which includes the electron emission device 10 of the present invention.

An air blower device 150 illustrated in FIG. 10 includes an electron emission device 10 which includes (i) an electron emission element 1 and (ii) an electric power supply 7 for applying a voltage to the electron emission element 1. The electron emission device 10 of the air blower device 150 emits electrons toward a target to be cooled which is electrically grounded. This generates ionic wind. The target 41 is cooled by the ionic wind. The electric power supply 7 preferably applies approximately 18 V to the electron emission element 1. The electron emission element 1 is preferably configured to emit, for example, 1 µA/cm² of electrons per unit time on receipt of 18 V which is applied by the electric power supply 7.

An air blower device 160 illustrated in FIG. 11 further includes an air blower fan 42 in addition to an air blower device 150 illustrated in FIG. 10. An electron emission device 10 emits electrons to a target 41 to be cooled which is electrically grounded. This generates ionic wind. The ionic wind is sent to the target 41 by the air blower fan 42. The air blower device 160 thus cools the target 41. It is preferable that an amount of air to be sent by the air blower fan 42 is 0.9 L through 2 L per minute and square centimeter.

Since each of the air blower devices 150 and 160 of the present invention sends an air which contains charged particles such as electrons and ions, the air blower devices 150 and 160 remarkably improve a cooling efficiency, compared to a cooling device for cooling a target merely by sending a normal air to the target. Further, since the electron emission element 1 has a high electron emission efficiency, the air blower devices 150 and 160 can further efficiently cool a target to be cooled. The air blower devices 150 and 160 can also operate for a long period of time in the air.

It is preferable to configure the electron emission element of an embodiment of the present invention such that the insulating fine particles are (i) monodisperse insulating fine particles and (ii) aligned in the electron accelerating layer so as to fill the electron accelerating layer.

According to the configuration, contact points and conducting paths among the insulating fine particles are uniformly formed in the electron accelerating layer. This makes it possible to efficiently trap and conduct electrons in the whole electron accelerating layer. It is therefore possible to increase ballistic electrons in number below the thin film electrode, and to emit such many ballistic electrons. This ultimately further improves an electron emission efficiency of the electron emission element.

It is preferable to configure the electron emission element of an embodiment of the present invention such that the insulating fine particles of the electron accelerating layer contain at least one of silicon oxide, aluminum oxide, and titanium oxide.

Such materials (silicon oxide, aluminum oxide, and titanium oxide) have a high resistivity (a high electric insulating property). It is therefore possible to control a resistance of the electron accelerating layer in a desired range.

It is preferable to configure the electron emission element of an embodiment of the present invention such that the insulating fine particles have an average diameter of 5 nm through 1000 nm. The insulating fine particles more preferably have an average diameter of 15 nm through 500 nm.

According to the configuration, it is possible to (i) efficiently radiate joule heat which is generated by flowing of current in the electron emission element, and (ii) prevent the electron emission element from being destroyed by heat which is generated during operation of the electron emission element. It is further possible to easily control the resistance of the electron accelerating layer.

It is preferable to configure the electron emission element of an embodiment of the present invention such that the electron accelerating layer has a thickness of 8 nm through 3000 nm. According to the configuration, it is possible to (i) level off a surface of the electron accelerating layer and (ii) control, along a layer thickness direction of the electron accelerating layer, the resistance of the electron accelerating layer. The electron accelerating layer more preferably has a thickness of 30 nm through 1000 nm.

It is preferable to configure the electron emission element of an embodiment of the present invention such that heights of the convex parts of the electrode substrate are 50% through 80% of the thickness of the electron accelerating layer. This prevents the electrode substrate and the thin film electrode to be short-circuited by forming the openings in the thin film electrode.

(i) Formation of many convex and concave parts on the electrode substrate and (ii) leveling off the surface of the electron accelerating layer make it possible to efficiently emit, with a high control accuracy, electrons from desired locations of a whole surface of the electron emission element.

An electron emission device of an embodiment of the present invention is configured to be an electron emission device, including: one of the above-described electron emission elements; and an electric power supply for applying a voltage across the electrode substrate and the thin film electrode.

According to the configuration, it is possible to secure an electric conductivity which allows a sufficient current to flow in the electron emission element, thereby efficiently and stably emitting ballistic electrons from the thin film electrode.

A light emitting device of an embodiment of the present invention is configured to be a light emitting device, including: the electron emission device; and a luminescent material, the luminescent material being caused to emit light on receipt of electrons emitted from the electron emission device. An image display device of an embodiment of the present invention is configured to be an image display device, including the light emitting device.

According to the configurations, by including the electron emission element of an embodiment of the present invention, a light emitting device, and an image display device which includes the light emitting device can stably operate and emit light from respective surfaces for years.

An air blower device of an embodiment of the present invention is configured to be an air blower device, including the electron emission device, the air blower device being configured to blow electrons emitted from the electron emission device. A cooling device of an embodiment of the present invention is configured to be a cooling device, including the electron emission device, the cooling device being configured to cool a target to be cooled by causing the electron emission device to emit electrons to the target.

According to the configurations, an air blower device or a cooling device, which includes the electron emission element of an embodiment of the present invention, neither carries out electric discharge nor generates harmful materials such as ozone and nitrogen oxide, but can efficiently cool a target to be cooled by utilizing a slip effect on a surface of the target.

A charge device of an embodiment of the present invention is configured to be a charge device, including the electron emission device, the charge device being configured to electrically charge a photosensitive material by causing the electron emission device to emit electrons to the photosensitive material. An image forming device of an embodiment of the present invention is configured to be an image forming device, including the charge device.

According to the configurations, by including the electron emission element of an embodiment of the present invention, a charge device and an image forming device which includes the charge device, neither carry out electric discharge nor generate harmful materials such as ozone and nitrogen oxide, but can stably and electrically charge a target to be charged for a long period of time.

An electron radiation curing device of an embodiment of the present invention is configured to be an electron radiation curing device, including any one of the above described electron emission devices.

According to the configuration, the electron emission element is a planar electron emission source. Therefore, the electron emission element can simultaneously emit electrons extensively, while a conventional field electron emission element is a point electron emission source. Therefore, the electron radiation curing device including the electron emission element of an embodiment of the present invention can two-dimensionally irradiate a resist with electron beams so as to cure the resist. Further, the electron radiation curing device can cure a resist without any mask, thereby attaining reduction in cost and high throughput.

It is preferable to arrange the method for manufacturing an electron emission element such that the step (a) of forming the electron accelerating layer on the electrode substrate includes a step of forming an insulating fine particle layer of the insulating fine particles on the electrode substrate, and the insulating fine particle layer is formed by applying a solvent onto the electrode substrate by spin-coating, the solvent containing the insulating fine particles dispersed in the solvent.

According to the arrangement, the solvent is applied by the spin-coating. This makes it possible to remarkably easily and extensively apply the insulating fine particles. It is therefore possible to easily manufacture an electron emission element which is applicable to a device which should emit electrons extensively.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

An electron emission element of the present invention has an electric conductivity so as to allow a sufficient current to flow in the electron emission element, thereby emitting ballistic electrons from a thin film electrode. Therefore, the electron emission element is applicable to, for example, a charge device of an image forming device such as an electrophotographic copying machine, a printer or a facsimile. The electron emission element is also applicable to, for example, (i) an electron radiation curing device, (ii) an image display device by combining the electron emission element with a fluorescent material and (iii) a cooling device which utilizes ionic wind generated by emission of electrons.

REFERENCE SIGNS LIST

1: electron emission element
2: electrode substrate
3: thin film substrate
4: electron accelerating layer
5: insulating fine particles
6: openings
7: electric power supply (electric power supplying section)
10: electron emission device
11: photosensitive drum
21: acceleration electrode
22: resist
31, 31a, and 31b: light emitting device
32: fluorescent material (luminescent material)
33: ITO thin film
34: glass substrate
35: electric power supply
36: luminescent section
41: a target to be cooled
42: air blower fan
90: charge device
100: electron radiation curing device
140: image display device
150: air blower device
160: air blower device
330: liquid crystal panel

The invention claimed is:
1. An electron emission element, comprising:
an electrode substrate;
a thin film electrode; and
an electron accelerating layer between the electrode substrate and the thin film electrode, the electron accelerating layer containing at least insulating fine particles,
the electron emission element emitting, from the thin film electrode, electrons which are accelerated between the electrode substrate and the thin film electrode by voltage application across the electrode substrate and the thin film electrode, the electrode substrate having a convexoconcave surface on which the electron accelerating layer is provided, and the thin film electrode having openings above convex parts of the convexoconcave surface of the electrode substrate.

2. The electron emission element as set forth in claim 1, wherein the insulating fine particles are (i) monodisperse insulating fine particles and (ii) aligned in the electron accelerating layer so as to fill the electron accelerating layer.

3. The electron emission element as set forth in claim 1, wherein the insulating fine particles contain at least one of silicon oxide, aluminum oxide, and titanium oxide.

4. The electron emission element as set forth in claim 1, wherein the insulating fine particles have an average diameter of 5 nm through 1000 nm.

5. The electron emission element as set forth in claim 1, wherein the electron accelerating layer has a thickness of 8 nm through 3000 nm.

6. The electron emission element as set forth in claim 1, wherein heights of the convex parts of the electrode substrate are 50% through 80% of the thickness of the electron accelerating layer.

7. An electron emission device, comprising:
an electron emission element as set forth in claim 1; and
an electric power supply for applying a voltage across the electrode substrate and the thin film electrode.

8. A light emitting device, comprising:
an electron emission device as set forth in claim 7; and
a luminescent material,
the luminescent material being caused to emit light on receipt of electrons emitted from the electron emission device.

9. An image display device, comprising a light emitting device as set forth in claim 8.

10. An air blower device, comprising an electron emission device as set forth in claim 7,
the air blower device being configured to blow electrons emitted from the electron emission device.

11. A cooling device, comprising an electron emission device as set forth in claim 7,
the cooling device being configured to cool a target to be cooled by causing the electron emission device to emit electrons to the target.

12. A charge device, comprising an electron emission device as set forth in claim 7,
the charge device being configured to electrically charge a photosensitive material by causing the electron emission device to emit electrons to the photosensitive material.

13. An image forming device, comprising a charge device as set forth in claim 12.

14. An electron radiation curing device, comprising an electron emission device as set forth in claim 7.

15. A method for manufacturing an electron emission element which includes an electrode substrate, a thin film electrode, and an electron accelerating layer that contains at least insulating fine particles, the electron emission element emitting, from the thin film electrode, electrons which are accelerated between the electrode substrate and the thin film electrode by voltage application across the electrode substrate and the thin film electrode, said method comprising the steps of:
(a) forming the electron accelerating layer on the electrode substrate;
(b) forming the thin film electrode on the electron accelerating layer; and
(c) forming openings in the thin film electrode,
the electrode substrate having a convexoconcave surface on which the electron accelerating layer is provided, and
in the step (c), the opening being formed above convex parts of the electrode substrate in the thin film electrode by voltage application across the substrate electrode having the convexoconcave surface and the thin film electrode.

16. The method as set forth in claim 15, wherein
the step (a) includes a step of forming an insulating fine particle layer of the insulating fine particles on the electrode substrate, and
the insulating fine particle layer is formed by applying a solvent onto the electrode substrate by spin-coating, the solvent containing the insulating fine particles dispersed in the solvent.

* * * * *